United States Patent
Rhodes et al.

(10) Patent No.: US 10,997,002 B2
(45) Date of Patent: May 4, 2021

(54) QUICK ACTIONS

(71) Applicant: ServiceNow, Inc., Santa Clara, CA (US)

(72) Inventors: Scott Michael Rhodes, Torrance, CA (US); Srikanth Mallikarjuna, San Diego, CA (US); Andrew Thomas Roberts, San Diego, CA (US); Daniel Li-Shuan Wu, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/402,727

(22) Filed: May 3, 2019

(65) Prior Publication Data

US 2020/0348991 A1 Nov. 5, 2020

(51) Int. Cl.
| | | |
|---|---|---|
| *G06F 9/54* | (2006.01) | |
| *G06F 3/0484* | (2013.01) | |
| *G06F 3/0488* | (2013.01) | |
| *G06F 16/903* | (2019.01) | |
| *G06F 9/50* | (2006.01) | |

(52) U.S. Cl.
CPC ............ *G06F 9/546* (2013.01); *G06F 3/0484* (2013.01); *G06F 3/04883* (2013.01); *G06F 9/541* (2013.01); *G06F 16/903* (2019.01); *G06F 9/50* (2013.01)

(58) Field of Classification Search
CPC ...... G06F 3/0484; G06F 3/04883; G06F 9/50; G06F 9/541; G06F 9/546; G06F 16/903
See application file for complete search history.

(56) References Cited

U.S. PATENT DOCUMENTS

| | | | |
|---|---|---|---|
| 5,864,338 A | * | 1/1999 | Nestor .................... G06F 16/40 715/201 |
| 6,321,229 B1 | | 11/2001 | Goldman |
| 6,609,122 B1 | | 8/2003 | Ensor |
| 6,727,916 B1 | * | 4/2004 | Ballard ................ G06Q 10/107 715/758 |
| 6,799,189 B2 | | 9/2004 | Huxoll |
| 6,816,898 B1 | | 11/2004 | Scarpelli |
| 6,895,586 B1 | | 5/2005 | Brasher et al. |
| 7,020,706 B2 | | 3/2006 | Cates |
| 7,027,411 B1 | | 4/2006 | Pulsipher |
| 7,028,301 B2 | | 4/2006 | Ding |
| 7,062,683 B2 | | 6/2006 | Warpenburg |
| 7,131,037 B1 | | 10/2006 | LeFaive |
| 7,170,864 B2 | | 10/2007 | Matharu |
| 7,350,209 B2 | | 3/2008 | Shum |

(Continued)

*Primary Examiner* — Gil H. Lee
(74) *Attorney, Agent, or Firm* — Fletcher Yoder PC

(57) ABSTRACT

Utilizing quick actions includes receiving user input via a user input module of an agent workspace, wherein the user input comprises an action input comprising an action command, and in response to receiving the user input, determining a secondary menu for the action command, wherein the secondary menu comprises a plurality of selectable parameters for the action command, and presenting the secondary menu in association with the user input module. Utilizing quick actions also includes detecting a selection of a parameter from the selectable parameters, and triggering an action based on the action command and the selected parameter, wherein the action is associated with a process for the agent workspace.

18 Claims, 10 Drawing Sheets

(56) References Cited

U.S. PATENT DOCUMENTS

| | | |
|---|---|---|
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,933,927 B2 | 4/2011 | Dee |
| 7,940,496 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Naverrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,740 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 4/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 10,033,870 B1* | 7/2018 | Koster ............... H04M 7/0045 |
| 2005/0188007 A1* | 8/2005 | Warner ................ H04L 67/02 |
| | | 709/203 |
| 2007/0294368 A1* | 12/2007 | Bomgaars ............. H04L 63/20 |
| | | 709/217 |
| 2008/0307040 A1* | 12/2008 | So ..................... G06F 40/174 |
| | | 709/203 |
| 2016/0026962 A1* | 1/2016 | Shankar ......... G06Q 10/06398 |
| | | 705/7.42 |
| 2020/0258013 A1* | 8/2020 | Monnett ........... G06Q 10/0633 |

* cited by examiner

FIG. 8

ACTIVE CHAT

DETAILS

IMS002019 [CLOSE] [CREATE INCIDENT] [END CHAT]

DETAILS    RELATED TASKS    USER INTERACTIONS

NUMBER
IMS002019

OPENED FOR
ALAN TURNER

TYPE
CHAT

ASSIGNED TO
BRIANA ADAMS

PHONE CONFIRMATION
HI ALAN, I HAVE YOUR PHONE NUMBER AS
(555)345-9876, IS THIS CORRECT?

WAIT TIME
DAYS  HOURS  MINUTES
 0      0      6

WORK NOTES

AVAILABLE SNIPPETS — 845

HI ALAN, I HAVE YOUR PHONE NUMBER AS (555)345-987...
PC

GOOD AFTERNOON
GA

GOOD MORNING
GM

/S — 840

QUICK ACTIONS

TECHNICAL FIELD

Embodiments described herein generally relate to an agent workspace in an enterprise, and more particularly, to providing quick actions to agents for processes in an enterprise environment.

BACKGROUND

A variety of enterprise and/or information technology (IT) related software applications may be utilized to support various functions of an enterprise such as Finance, Human Resource (HR), IT, Legal, Marketing, Sales, and the like. The software applications may be deployed on an instance platform on a server and accessed as needed over a network such as a Local Area Network (LAN) or the Internet. The server may be a local enterprise server as part of a self-hosted system or a remote server located in the Cloud as part of a cloud computing system.

Cloud computing relates to sharing of computing resources that are generally accessed via the Internet. Cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or IT related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment utilizing quick actions includes receiving user input via a user input module of an agent workspace, wherein the user input comprises an action input comprising an action command, and in response to receiving the user input, determining a secondary menu for the action command, wherein the secondary menu comprises a plurality of selectable parameters for the action command, and presenting the secondary menu in association with the user input module. Utilizing quick actions also includes detecting a selection of a parameter from the selectable parameters, and triggering an action based on the action command and the selected parameter, wherein the action is associated with a process for the agent workspace.

In another embodiment, the method may be embodied in computer executable program code and stored in a non-transitory storage device. In yet another embodiment, the method may be implemented on a (cloud-based or self-hosted) computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 8 shows an example user interface 800 showing available snippets as quick actions, according to one or more embodiments.

DESCRIPTION OF EMBODIMENTS

Figure 1:
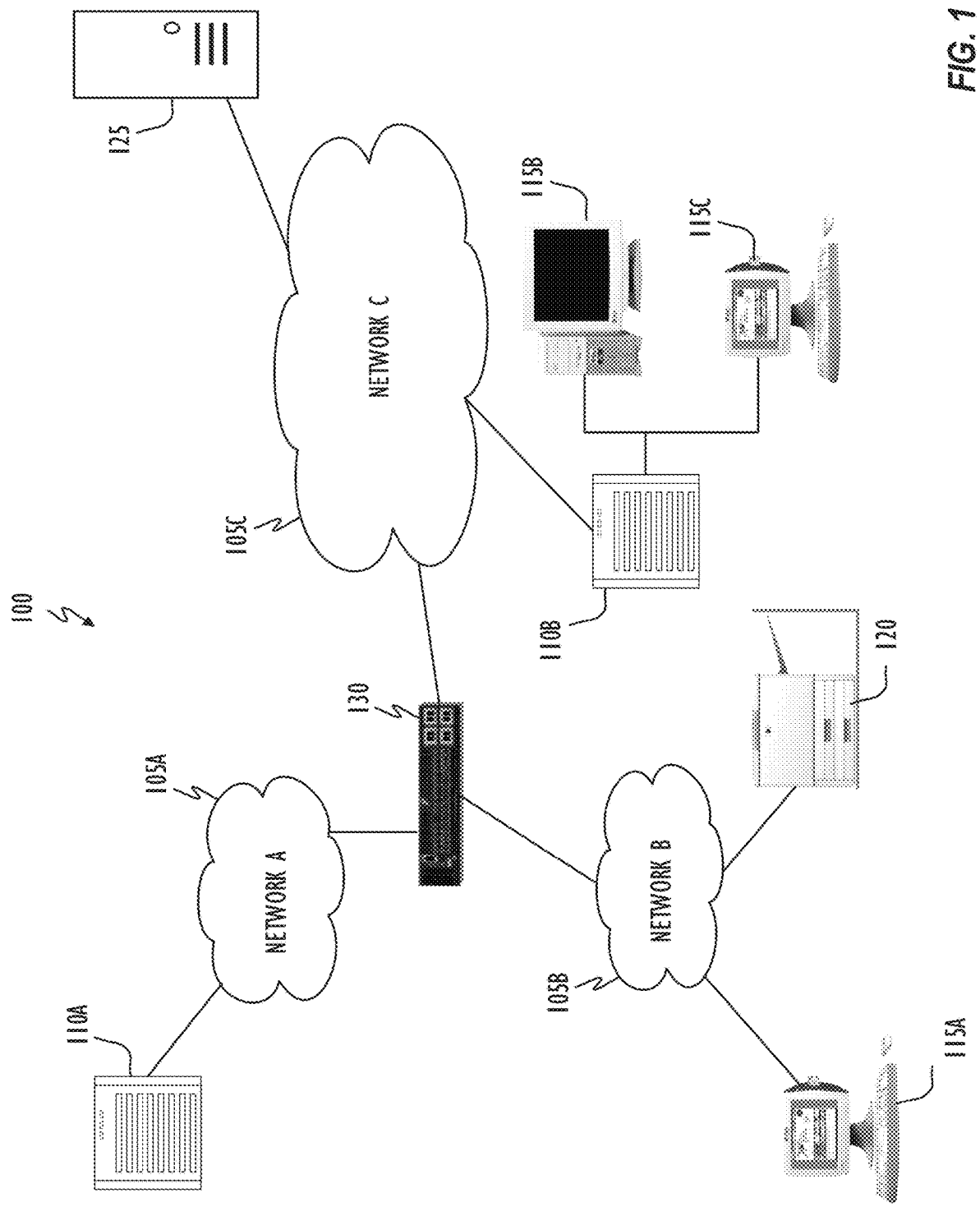
FIG. 1 illustrates a block diagram of self-hosted network system 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other embodiments, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine hosted on one of more physical devices, virtual container hosted on one or more physical devices, host, server, laptop, tablet, and/or mobile device or to a plurality of electronic computing devices working together to perform the function described as being performed on or by the computing system.

As used herein, the term "medium" or "memory" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system or one or more hardware processors. Example embodiments of an application include software modules, software objects, software instances and/or other types of executable code.

Embodiments described herein are generally directed to quick actions. In one or more embodiments, an agent may manage various technical and enterprise services, create and respond to incidents, and the like, through an agent workspace. An agent workspace may include a user interface which acts as a dashboard and allows the agent to perform various actions. In order to do so, the agent workspace may include text modules in which the agent may enter text. Text modules may be associated, for example, with a chat module, work notes, and the like.

The text modules may support quick actions. Quick actions may begin with an identifier, such as a "/" or other character or set of characters. In one or more embodiments, the identifier may be followed by an action command indicating the action to be performed, and may be followed by an action parameter which may determine how the action is performed. In one or more embodiments, selection or entry of a quick action may trigger performance of an action, or may result in a secondary menu being generated. The secondary menu may be customizable based on the particular agent, and may provide options for how the action is performed.

In one or more embodiment, the action may include snippets, which may be preconfigured, and which may be available for a particular agent or group of agents. Further, in one or more embodiments, the quick action may trigger a process to be performed by a secondary or remote application. The quick action may utilize an API to trigger performance of an action based on an entered or selected quick action.

FIG. 1 depicts an illustrative self-hosted network system 100 where one or more embodiments of the present disclosure may operate. This illustrative network system 100 may include a plurality of networks 105, (i.e., 105A, 105B, and 105C), each of which may take any form including, but not limited to, a local area network (LAN) or a WAN, such as the Internet. Further, networks 105 may use any desired technology (wired, wireless, or a combination thereof) and protocol (e.g., transmission control protocol, TCP). Coupled to networks 105 are data server computers 110 (i.e., 110A and 110B) that are capable of operating server applications such as databases and also capable of communicating over networks 105. One embodiment using server computers may involve the operation of one or more central systems to log user session data and identify session signatures of the user session.

Client computers 115 (i.e., 115A, 115B, and 115C), which may take the form of any smartphone, gaming system, tablet, computer, set top box, entertainment device/system, television, telephone, communications device, or intelligent machine, including embedded systems, may also be coupled to networks 105, and/or data server computers 110. In some embodiments, network system 100 may also include network printers such as printer 120 and storage systems such as 125, which may be used to store user session data or other data that are referenced herein. To facilitate communication between different network devices (e.g., data servers 110, end-user computers 115, network printer 120, and storage system 125), at least one gateway or router 130 may be optionally coupled there between. Furthermore, to facilitate such communication, each device employing the network may comprise a network adapter circuit and related software. For example, if an Ethernet network is desired for communication, each participating device must have an Ethernet adapter or embedded Ethernet capable ICs. Further, the devices may carry network adapters for any network in which they might participate (including, but not limited to, personal area networks (PANs), LANs, WANs, and cellular networks).

Figure 2:
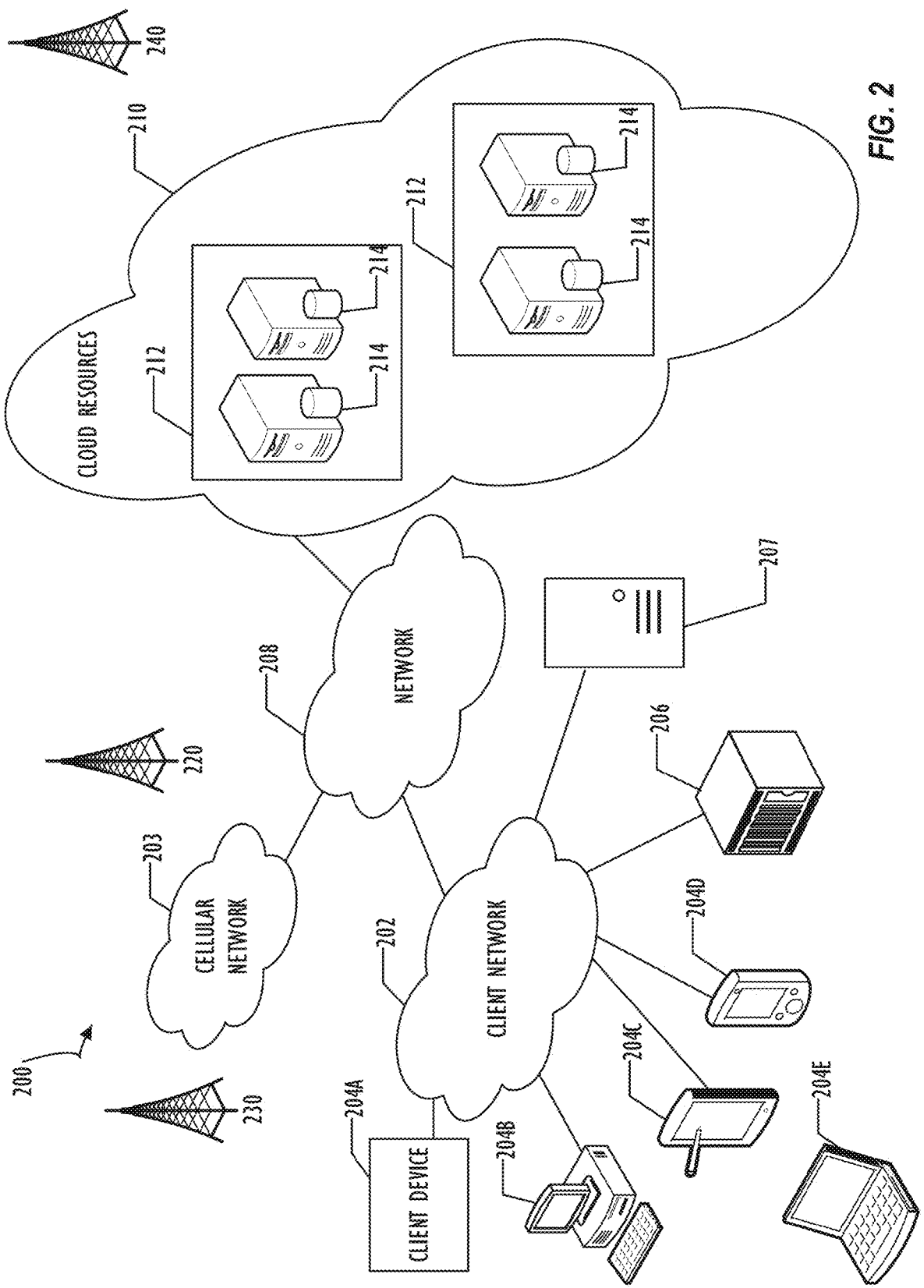
FIG. 2 illustrates a block diagram of cloud computing infrastructure 200 where one or more embodiments of the present disclosure may operate.

FIG. 2 illustrates a block diagram of an embodiment of a cloud computing infrastructure 200 where one or more embodiments of the present disclosure may operate. Cloud computing infrastructure 200 comprises a client network 202, network 208, and a cloud resources platform/network 210. In one embodiment, the client network 202 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 202 represents an enterprise network that could include or be communicatively coupled to one or more local area networks (LANs), virtual networks, data centers and/or other remote networks (e.g., 208, 210). As shown in FIG. 2, client network 202 may be connected to one or more client devices 204A-E and allow the client devices to communicate with each other and/or with cloud resources platform/network 210. Client devices 204A-E may be computing systems such as desktop computer 204B, tablet computer 204C, mobile phone 204D, laptop computer (shown as wireless) 204E, and/or other types of computing systems generically shown as client device 204A. Each of client devices 204A-E may be similar to any of client computers 115 of network system 100 shown in FIG. 1. FIG. 2 also illustrates that client network 202 may be connected to a local compute resource 206 that may include a server, access point, router, or other device configured to provide for local computational resources and/or to facilitate communication amongst networks and devices. For example, local compute resource 206 may be one or more physical local hardware devices configured to communicate with wireless network devices and/or facilitate communication of data between client network 202 and other networks such as network 208 and cloud resources platform/network 210. Local compute resource 206 may also facilitate communication between other external applications, data sources, and services, and client network 202.

FIG. 2 also illustrates that client network 202 may be connected to a computer configured to execute a management, instrumentation, and discovery (MID) server 207. For example, MID server 207 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 207 may be configured to assist functions such as, but not necessarily limited to, discovery, orchestration, service mapping, service analytics, and event management. MID server 207 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 200 also includes cellular network 203 for use with mobile communication devices. Mobile cellular networks support mobile phones and many other types of mobile devices such as laptops etc. Mobile devices in cloud computing infrastructure 200 are illustrated as mobile phone 204D, laptop 204E, and tablet 204C. A mobile device such as mobile phone 204D may interact with one or more mobile provider networks as the mobile device moves, typically interacting with a plurality of mobile network towers 220, 230, and 240 for connecting to the cellular network 203. Although referred to as a cellular network in FIG. 2, a mobile device may interact with towers of more than one provider network, as well as with multiple non-cellular devices such as wireless access points and routers (e.g., local compute resource 206). In addition, the mobile devices may interact with other mobile devices or with non-mobile devices such as desktop computer 204B and various types of client device 204A for desired services. Although not specifically illustrated in FIG. 2, client network 202 may also include a dedicated network device (e.g., gateway or router) or a combination of network devices that implement a customer firewall or intrusion protection system.

FIG. 2 illustrates that client network 202 is coupled to a network 208. Network 208 may include one or more computing networks, such as other LANs, wide area networks (WANs), the Internet, and/or other remote networks, to transfer data between client devices 204A-E and cloud resources platform/network 210. Each of the computing networks within network 208 may contain wired and/or wireless programmable devices that operate in the electrical and/or optical domain. For example, network 208 may include wireless networks, such as cellular networks in addition to cellular network 203. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 208 may also employ any number of network communication protocols, such as Transmission Control Protocol (TCP) and Internet Protocol (IP). Although not explicitly shown in FIG. 2, network 208 may include a variety of network devices, such as servers, routers, network switches, and/or other network hardware devices configured to transport data over networks.

In FIG. 2, cloud resources platform/network 210 is illustrated as a remote network (e.g., a cloud network) that is able to communicate with client devices 204A-E via client network 202 and network 208. The cloud resources platform/network 210 acts as a platform that provides additional computing resources to the client devices 204A-E and/or client network 202. For example, by utilizing the cloud resources platform/network 210, users of client devices 204A-E may be able to build and execute applications, such as automated processes for various enterprise, IT, field service and/or other organization-related functions. In one embodiment, the cloud resources platform/network 210 includes one or more data centers 212, where each data center 212 could correspond to a different geographic location. Within a particular data center 212 a cloud service provider may include a plurality of server instances 214. Each server instance 214 may be implemented on a physical computing system, such as a single electronic computing device (e.g., a single physical hardware server) or could be in the form of a multi-computing device (e.g., multiple physical hardware servers). Examples of server instances 214 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 210, network operators may choose to configure data centers 212 using a variety of computing infrastructures. In one embodiment, one or more of data centers 212 are configured using a multi-tenant cloud architecture such that a single server instance 214, which can also be referred to as an application instance, handles requests and serves more than one customer. In some cases, data centers with multi-tenant cloud architecture commingle and store data from multiple customers, where multiple client instances are assigned to a single server instance 214. In a multi-tenant cloud architecture, the single server instance 214 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 214 causing outages for all customers allocated to the single server instance 214.

In another embodiment, one or more of the data centers 212 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 214 and/or other combinations of server instances 214, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 210, and customer-driven upgrade schedules. An example of implementing a client instance within a multi-instance cloud architecture will be discussed in more detail below when describing FIG. 3.

Figure 3:
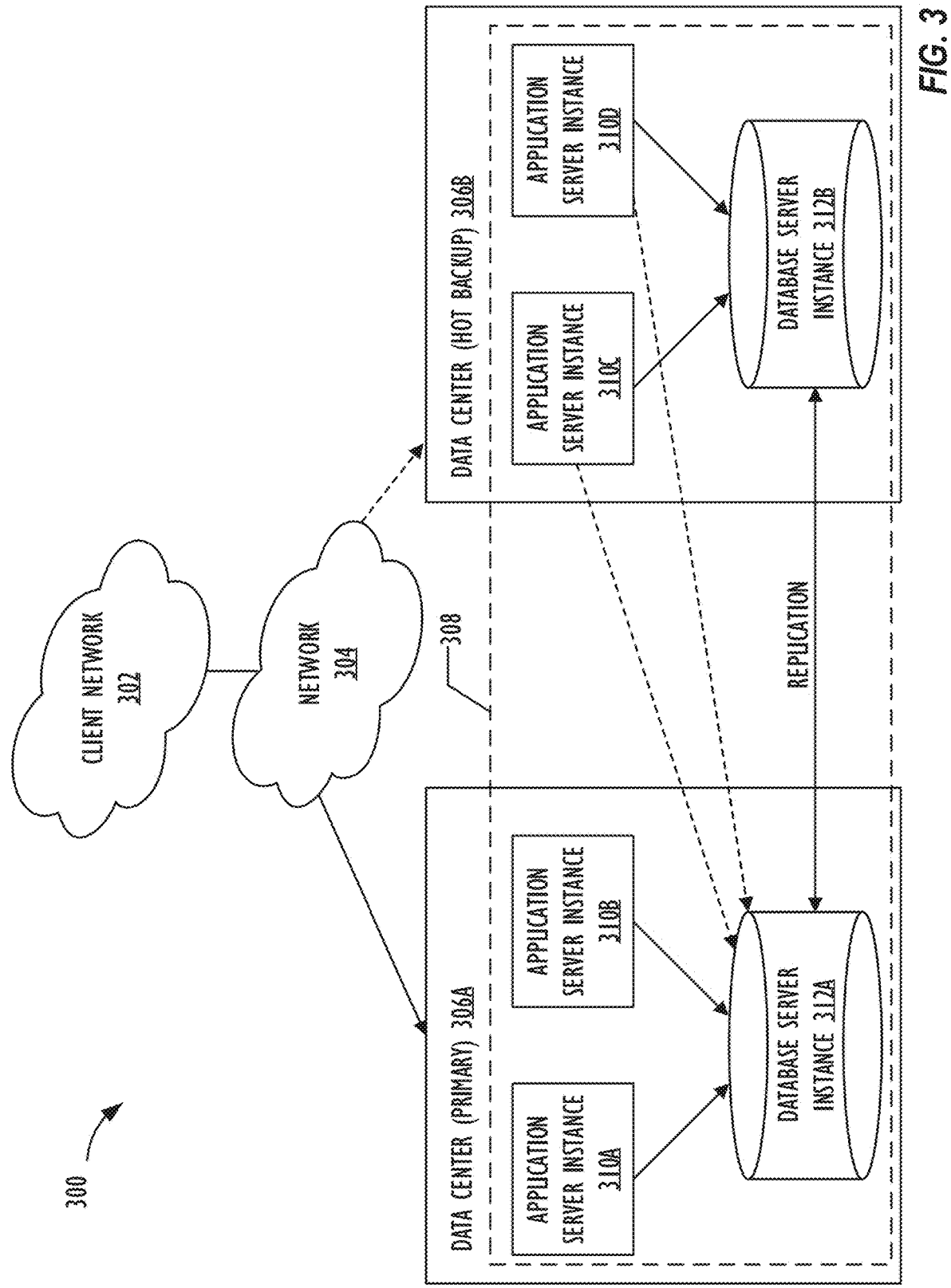
FIG. 3 illustrates a block diagram of multi-instance cloud architecture 300 where one or more embodiments of the present disclosure may operate.

In one embodiment, utilizing a multi-instance cloud architecture, a first client instance may be configured with a client-side application interface such as, for example, a web browser executing on a client device (e.g., one of client devices 204A-E of FIG. 2). FIG. 3 illustrates a block diagram of an embodiment of a multi-instance cloud architecture 300 where embodiments of the present disclosure may operate. FIG. 3 illustrates that the multi-instance cloud architecture 300 includes a client network 302 that connects to two data centers 306A and 306B via network 304. Client network 302 and network 304 may be substantially similar to client network 302 and network 208 as described in FIG. 2, respectively. Data centers 306A and 306B can correspond to FIG. 2's data centers 212 located within cloud resources platform/network 210. Using FIG. 3 as an example, a client instance 308 is composed of four dedicated application server instances 310A-310D and two dedicated database server instances 312A and 312B Stated another way, the application server instances 310A-310D and database server instances 312A and 312B are not shared with other client instances 308. Other embodiments of multi-instance cloud architecture 300 could include other types of dedicated server instances, such as a web server instance. For example, client instance 308 could include the four dedicated application server instances 310A-310D, two dedicated database server instances 312A and 312B, and four dedicated web server instances (not shown in FIG. 3).

To facilitate higher availability of client instance 308, application server instances 310A-310D and database server instances 312A and 312B are shown to be allocated to two different data centers 306A and 306B, where one of data centers 306 may act as a backup data center. In reference to FIG. 3, data center 306A acts as a primary data center that includes a primary pair of application server instances 310A and 310B and primary database server instance 312A for client instance 308, and data center 306B acts as a secondary data center to back up primary data center 306A for client instance 308. To back up primary data center 306A for client instance 308, secondary data center 306B includes a secondary pair of application server instances 310C and 310D and a secondary database server instance 312B. Primary database server instance 312A is able to replicate data to secondary database server instance 312B. As shown in FIG. 3, primary database server instance 312A replicates data to secondary database server instance 312B using a replication operation such as, for example, a Master-Master MySQL Binlog replication operation. The replication of data between data centers could be implemented in real time or by implementing full backup weekly and daily incremental backups in both data centers 306A and 306B. Having both a primary data center 306A and secondary data center 306B allows data traffic that typically travels to the primary data center 306A for client instance 308 to be diverted to secondary data center 306B during a failure and/or maintenance scenario. Using FIG. 3 as an example, if application server instances 310A and 310B and/or primary data server instance 312A fail and/or are under maintenance, data traffic for client instance 308 can be diverted to secondary application server instances 310C and 310D and secondary database server instance 312B for processing.

Although FIGS. 2 and 3 illustrate specific embodiments of cloud computing system 200 and multi-instance cloud architecture 300, respectively, the disclosure is not limited to the specific embodiments illustrated in FIGS. 2 and 3. For example, although FIG. 2 illustrates that cloud resources platform/network 210 is implemented using data centers, other embodiments of the cloud resources platform/network 210 are not limited to data centers and can utilize other types of remote network infrastructures. Moreover, other embodiments of the present disclosure may combine one or more different server instances into a single server instance. Using FIG. 3 as an example, application server instances 310 and database server instances 312 can be combined into a single server instance. The use and discussion of FIGS. 1-3 are only exemplary to facilitate ease of description and explanation.

Figure 4:
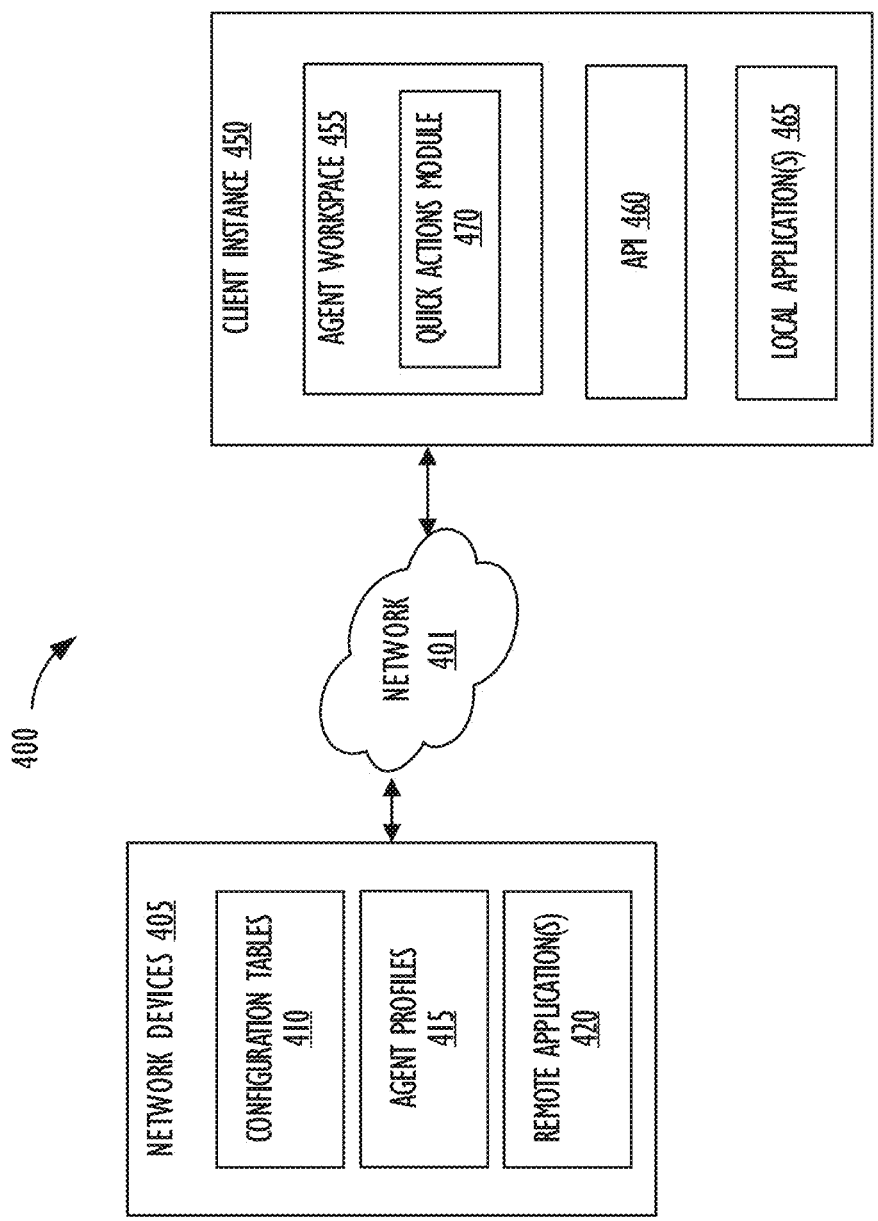
FIG. 4 illustrates a network infrastructure 400 where one or more embodiments of the present disclosure may operate.

FIG. 4 illustrates a block diagram of a basic network infrastructure 400 for providing quick actions to an agent, according to one or more embodiments. As shown in FIG. 4, network infrastructure 400 may include network devices 405 and a client instance 450 that may be deployed in a platform, that are communicatively coupled to each other through network 401. Network devices 405 may be substantially similar to any of the network devices as described in FIG. 1 or FIG. 2. Network 401 may be substantially similar to any of client network 102 and network 108, as described in FIG. 1, or client network 202 and network 208 of FIG. 2. Detailed description of remote network devices 405 and network 401 is omitted here. Client instance 450 may be hosted in a platform, which may be substantially similar to any of local compute resource 106 and server instance 114, as described in FIG. 1, and application server instances 310A-310D, database server instances 312A and 312B, as described in FIG. 2. That is, the platform may correspond to a cloud-based server of cloud computing infrastructure 200, as described in FIG. 2. Although the various components are described as located in particular locations and with particular functionality, in one or more embodiments, the various modules may be differently located. Further, the functionality may be differently distributed across the network infrastructure 400 or in different locations not shown.

Client instance 450 may be substantially similar to client instance 308, as described in FIG. 3 Client instance 450 may act as a hosted client instance platform for deploying various enterprise and/or IT related software applications and related enterprise data on a live database. Client instance 450 may be hosted on any of data server computers 110, as described in FIG. 1, and cloud resources platform/network 210, as described in FIG. 2, and may be accessible by a user of network devices 405 via network 401 through an application interface such as, for example, a graphical user interface (GUI) or a web browser executing on remote client device 405, in order to access software applications, services, and data deployed on client instance 450. Client instance 450 may include an agent workspace 455, which may include an interface that allows a user, such as an agent, to utilize one or more capabilities in areas of the enterprise such as IT, IT support, security, customer service, technical support, e-mail, backup and storage, HR, finance, legal, marketing, sales, compliance, and governance. The various capabilities may be provided in the form of local applications 465 (local to the client instance 450) hosted by the client instance 450.

According to one or more embodiments, an agent may utilize and manage various enterprise services through agent workspace 455. Agent workspace 455 may include a user interface which acts as a dashboard and allows the agent to perform various actions for managing enterprise services. In order to do so, the agent workspace may include text modules in which the agent may enter text, in which quick actions may be utilized. According to one or more embodiments, the agent workspace 455 may include a quick actions module 470, which may manage the various quick actions.

In one or more embodiments, the quick actions may trigger performance of operations by other applications, such as local applications 465 or remote applications 420. In one or more embodiments, agent workspace 455 may communicate with the local applications 465 and/or the remote applications 420 through application program interface ("API") 460.

In one or more embodiments, a quick action may trigger a secondary menu. Secondary menus associated with quick actions may be preconfigures and stored, for example, in configuration tables 410. In addition, in one or more embodiments, the quick action may allow a user to select preconfigured text, called "snippets." Those snippets may be preconfigured, for example by the agent or an administrator, and stored in the configuration table 410. In one or more embodiments, the various quick actions, menus, and/or snippets may be made available to a single agent or to groups of agents. For example, the agent profile 415 may indicate which quick actions are available to a particular agent. As another example, the various quick actions may be made available to particular teams of agents, or agents with particular roles.

Figure 5:
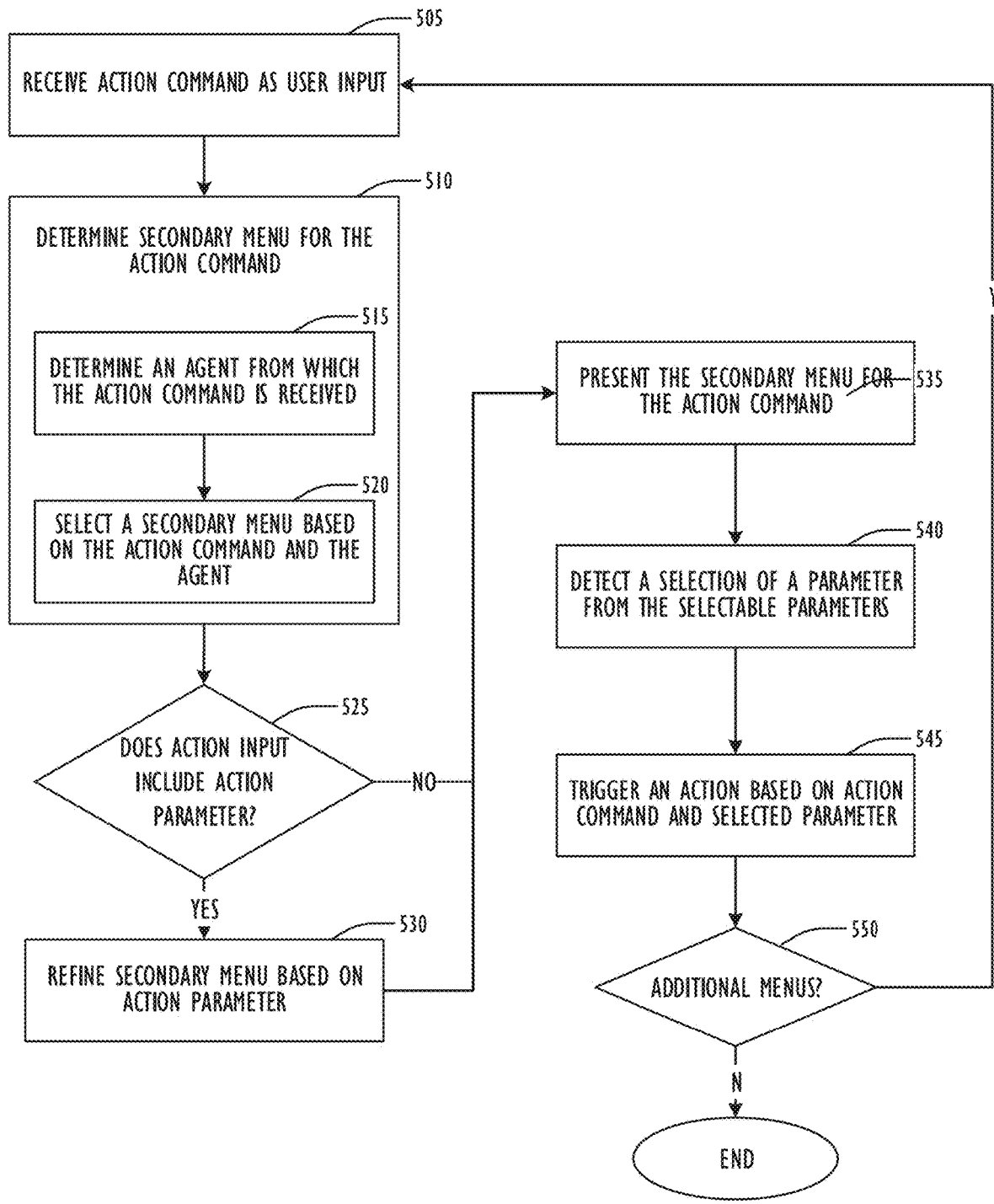
FIG. 5 shows a flowchart illustrating a method for triggering an action based on an action command, according to one or more embodiments.

FIG. 5 shows flowchart 500 illustrating operations of various components in the network infrastructure, according to one or more embodiments. The various operations are depicted as being performed by various components as described above with respect to FIG. 5. However, it should be understood that, according to one or more embodiments, one or more of the various processes depicted in FIG. 5 may be performed by alternative or additional components, such as those described above with respect to FIGS. 1-4. In addition, one or more of the various operations may be performed in a different order. Further, one or more operations may be omitted, and/or additional operations may be included in the flow, according to one or more embodiments.

The flowchart begins at 505 where the agent workspace receives an action command as user input. In one or more embodiments, the action command may be identifiable as beginning with a special character, such as a slash ("/"). In one or more embodiments, the action command may be entered into a user interface, such as in a text box. Additionally, or alternatively, the action commands may be presented as selectable options to the user. The action commands presented to, or otherwise available to, the user may be based on a particular role of the user, such as a particular group or subgroup of users, a particular rank, type of work, or the like. The flowchart continues at 510 where a quick actions module 470 determine a secondary menu for the action command. In one or more embodiments, the secondary menu may be specific to the action command entered by the user. The secondary menu may be displayed to the user, for example, as a series of selectable modules indicative of each item of the secondary menu. Secondary menus may be menus that are initiated from another menu. For purposes of this disclosure, a secondary menu may refer to any menu that is presented after an initial menu in response to a quick action. That is, as described, a tertiary menu or the like may also be described as a "secondary menu."

In one or more embodiments, the secondary menu may further differ based on characteristics of the user that enters the action command. For example, the quick action module may, at 515, determine an agent from which the action command is received. As an example, the agent may be associated with a particular role, team, or be part of a particular group. Further, the agent may have particular characteristics, such as specific training, certification, and the like. The various attributes of the agent may be determined, for example, from the agent profiles 415. Then, at 520, the quick actions module 470 selects a secondary menu based on the action command and the agent. As described above, the availability of the secondary menus and menu items may be based on the agent or attributes of the agent.

The flowchart continues at 525 and the quick action module 525 determines whether the action input includes an action parameter. In one or more embodiments, the received action command at 505 may be followed by an action parameter which may indicate how the action command should be performed, or may further clarify the action command.

If, at 525, the action input includes an action parameter, then the flowchart continues at 530 and the quick actions module 470 refines the secondary menu based on the action parameter. For example, the particular menu items may be selected or reined based on the action parameter. Alternatively, in one or more embodiments, the secondary menu may be determined, at 510, based on part on the action parameter.

After the secondary menu is refined based on the action parameter at 530, or, returning to 525, if a determination is made the at the action input does not include an action parameter, then the flowchart continues at 535. At 535, the quick action module 470 presents the secondary menu for the action command within agent workspace 455. The secondary menu may be presented, for example, in the form of a series of selectable menu items. In one or more embodiments, the secondary menu may be presented alternatively, or additionally, in the form of a list of options with a prompt of text or characters which may be entered to indicate a selection of a particular menu item.

The flowchart continues at 540 where the quick action module 470 detects a selection of a parameter from the selectable parameters. The flowchart concludes at 545 where the quick action module 470 triggers an action based on the action command and the selected parameter.

In one or more embodiments, an action may trigger an additional secondary menu. As such, the flowchart continues at 550 and a determination is made regarding whether any additional menus are propagated by the action command. If so, the flowchart returns to 505 and an action command associated with the menu propagated by the action command at 540 is received, and the flowchart continues to iterate through the menus. Returning to 550, if a determination is made that no other menus are propagated, then the flowchart concludes.

Figure 6:
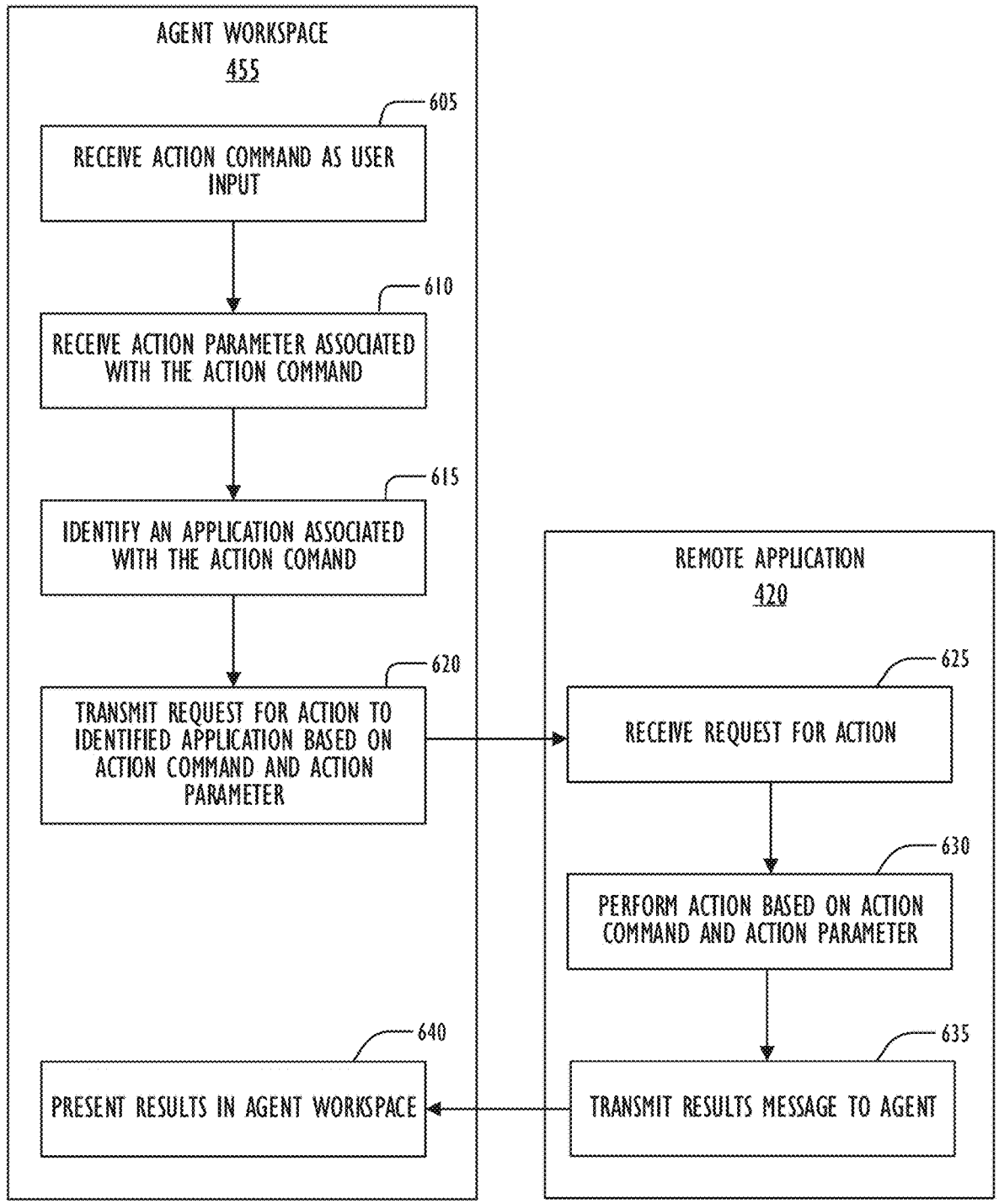
FIG. 6 shows a flowchart illustrating a method for utilizing a remote application from an agent workspace, according to one or more embodiments.

FIG. 6 shows a flow diagram for utilizing quick actions to trigger a process outside the agent workspace. As an example, the quick actions module 470 may utilize API 460 to perform an action by another application, such has local applications 465 or remote applications 420.

The flowchart begins at 605 where the quick actions module 470 receives an action command as user input. As described above with respect to FIG. 5, the action command may be received by an agent entering text, or by an agent selecting a selectable action command, or the like. Further, as described above, the action command may be received in a text box or other user-input module. As an example, the quick actions may be entered into a chat box, such as a chat box in agent workspace 455 in which the agent can chat with a user. As another example, the quick actions may be entered into other modules within the user interface, such as a notes portion of a user interface within agent workspace 455, in which the agent may enter text such as notes.

The flowchart continues at 610 where the quick actions module optionally receives an action parameter associated with the action command. As described above the action parameter may be entered by the agent, or selected by the agent. The action parameter may be received concurrently with the action command, or may be received after the action command. Then, at 615, the quick actions module identifies an application associated with the action command. As described above, the application may be local applications 465 within the client instance, or remote applications 420, such as an application within the platform, or within a managed network, or elsewhere. The flowchart continues at 620 where the quick actions module 470 transmits a request for an action to be performed to the identified application based on the action command and the action parameter, if the action parameter was entered. In one or more embodiments, the received action command may be followed by an action parameter which may indicate how the action command should be performed, or may further clarify the action command.

The flowchart continues at 625 where the remote application 420 receives the request for the action. Then at 630, the remote application performs the action based on the action command and the action parameter. The flowchart continues at 635 where the remote application transmits the results message to the agent via the agent workspace 455. In one or more embodiment, the results message may be a message to be displayed to the agent within the agent workspace.

The flowchart concludes at 640 where the quick actions module 470 presents the results in the agent workspace 640. In one or more embodiments, the results may be presented in the text box or other input module in which the quick action was received. The results message may indicate, for example, data requested by the quick action, or an indication that a process was initiated or completed as requested by the quick action.

Figure 7:
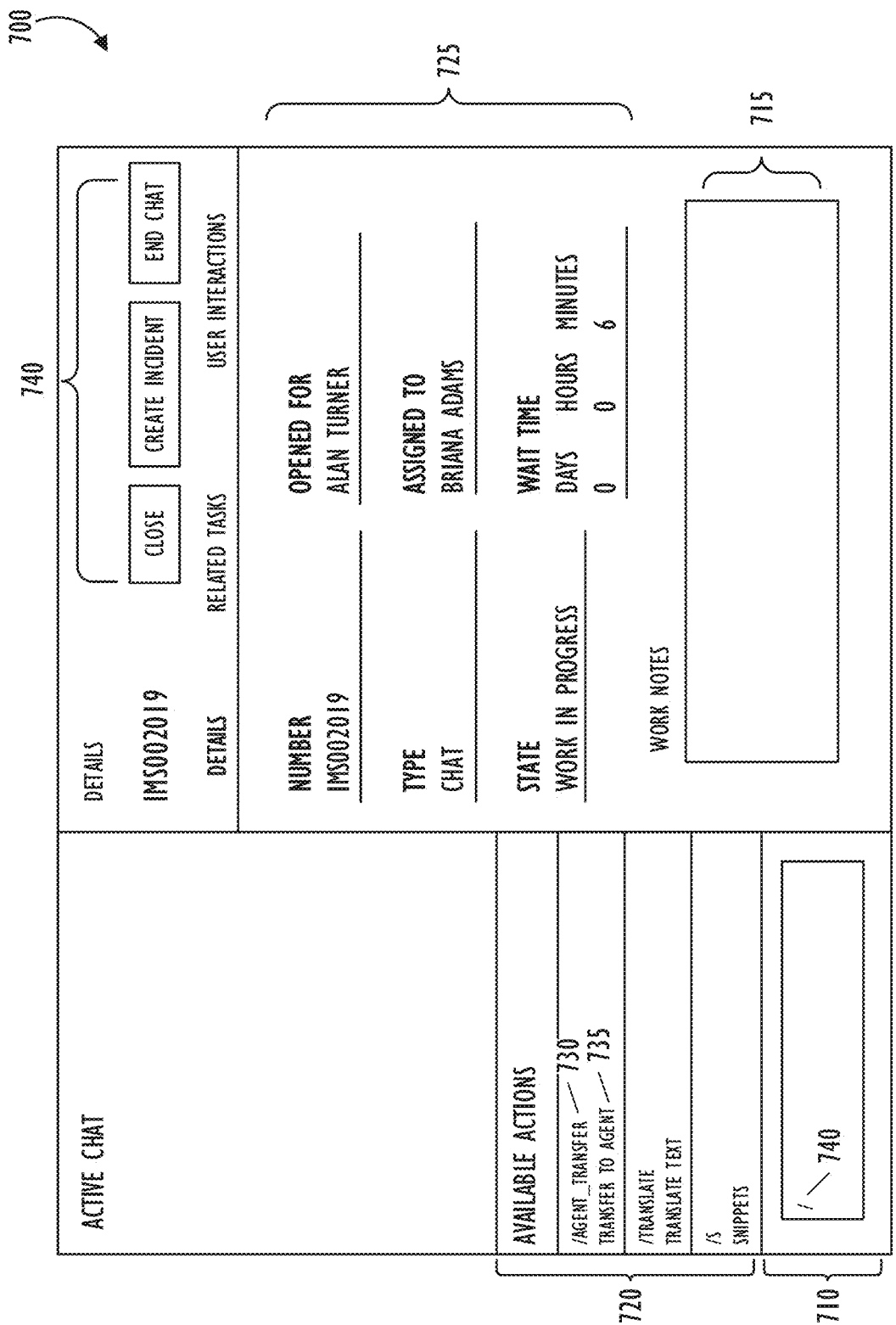
FIG. 7 shows an example user interface 700 showing available quick actions, according to one or more embodiments.

FIG. 7 depicts an example user interface in which quick actions may be utilized. The interface depicts an agent workspace 700 which allows an agent to manage enterprise resources. In the example shown, the agent workspace 700 depicts a workspace for agent Briana Adams in which the agent is assigned to respond to an issue reported by Alan Turner, as indicated in the workspace details 725. The workspace may include other modules, such as modules 740 which allow the agent to take actions with respect to the issue at hand, such as creating an incident, or ending a chat.

The agent workspace 700 may include a chat area 745 in which the agent (i.e., Briana Adams) may correspond with the user (i.e., Alan Turner). The agent may correspond by entering text into the text box area 710. In one or more embodiments, the agent may utilize quick actions within the chat area 710, or within other input areas, such as work notes 715, in which the agent may enter notes regarding the issue reported by Alan Turner. As shown, the agent has begun entering text in chat area 710. The text begins with a "/" 740, which may indicate that a quick action is being entered.

In one or more embodiment, available actions 720 may be displayed. The available actions may include the quick action 730, along with a description of the quick action 735. As depicted in the example, the quick action may be "/AGENT_TRANSFER," "/TRANSLATE," or "/S." As shown in the example, "/AGENT_TRANSFER" refers to transferring the issue to another agent. "/TRANSLATE" may relate to translating text, and "/S" may allow the agent to use snippets. The snippets will be explained in further detail below with respect to FIG. 8.

FIG. 8 depicts an example workspace in which snippets are utilized. The interface depicts an agent workspace 800 which allows an agent to manage enterprise resources. In the example shown, the agent workspace 800 depicts a workspace for agent Briana Adams in which the agent is assigned to respond to an issue reported by Alan Turner. The agent workspace 800 may include a chat area in which the agent (i.e., Briana Adams) may correspond with the user (i.e., Alan Turner). The agent may correspond by entering text into the text box area 810. In one or more embodiments, the agent may utilize quick actions within the chat area 810. As shown, the agent has begun entering text in chat area 810. The text begins with a "/S" 740, which may indicate that snippets should be utilized, as explained above with respect to FIG. 7.

In one or more embodiments, snippet may include predetermined sets of text which may be utilized in the text areas of the workspace. The snippets may be specific to a particular agent, group of agents, agent role, and the like. The snippets may be generated, for example, by the agent, or by an administrator. The snippets may be stored in configuration tables 410, for example.

In one or more embodiments, the selection of the snippets by either clicking on, entering, or otherwise selecting "/S" 840 may trigger the selection and presentation of a secondary menu 820 specific to the quick action. As described above, the secondary menu 820 may be generated and/or selected based on attributes of the agent (e.g., Briana Adams), such as role, group, certifications, and the like. Further, the secondary menu may be generated based on a source location (e.g., the chat box). That is, snippets that are phrases to be send to a user may be available in the chat box 810, but not in the work notes 715. Similarly, text that should be put in work notes 715 may be available through snippets within the work notes section, but not in the chat box 810.

In one or more embodiments, the available snippets 820 may be presented to the user within a secondary menu 820. In one or more embodiments, the secondary menu may include the available snippets. Each menu item may include the predefined text, as well as a short code (i.e., the parameter) which may be entered to select the snippet. As an example, menu item 845 includes a preview of the predefined text ("HI ALAN, I HAVE YOUR PHONE NUMBER AS (555)345-987 . . . "). Menu item 845 also includes the short code "PC" which may be entered as a parameter to the quick action in order to utilize the snippet. That is, the user may enter "/S PC" in order to utilize the predefined text.

In one or more embodiments, the user may select, or hover over a particular menu item within the submenu 820 to pull up a full preview of the snippet. For example, preview 850 shows the menu item 845 refers to a Phone Confirmation," and that the full text of the snippet as "HI ALAN, I HAVE YOUR PHONE NUMBER AS (555)345-9876, IS THIS CORRECT?" Thus, if the menu item 845 is selected, the full text will be entered into the text box.

Figure 9:
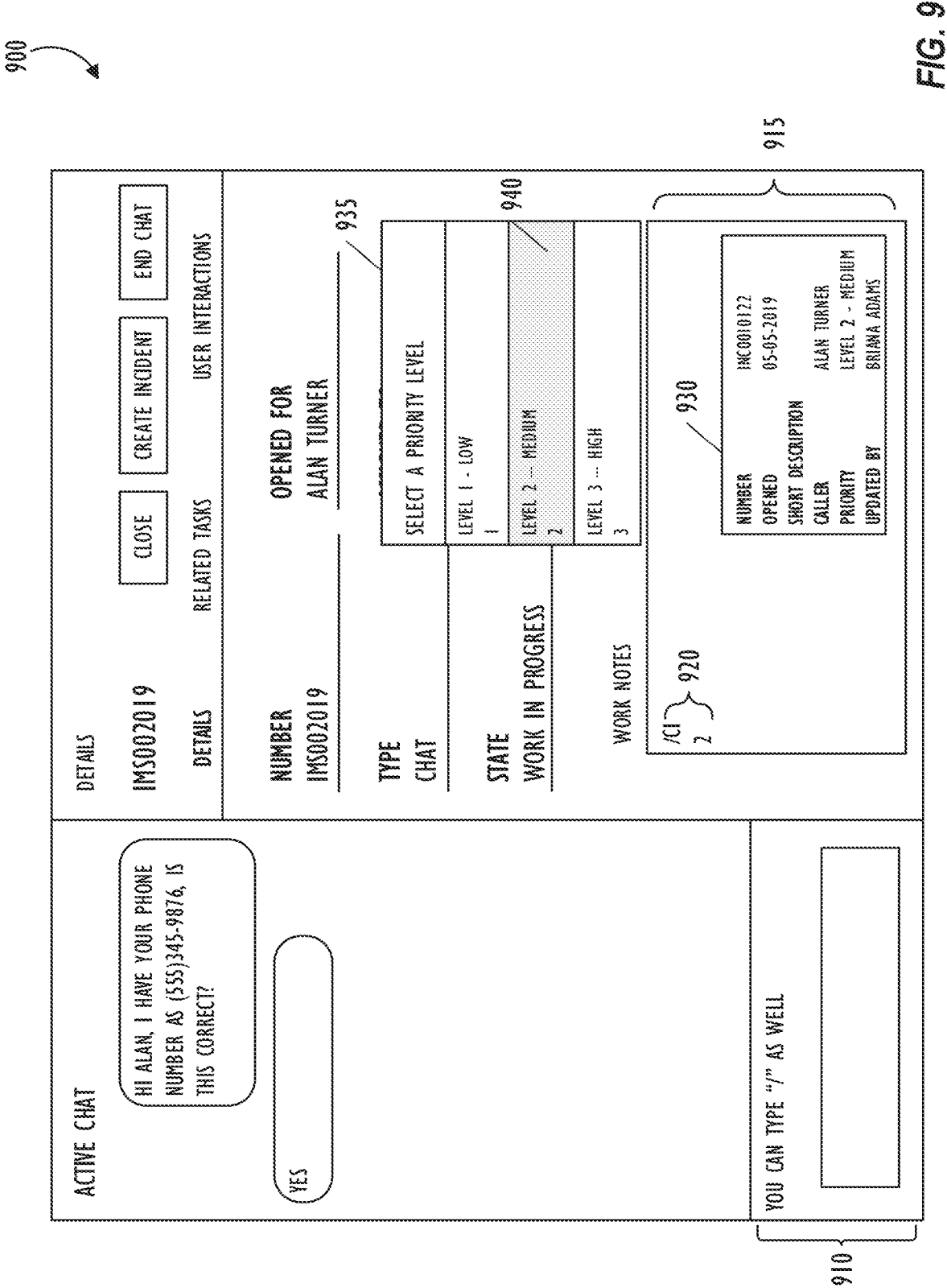
FIG. 9 shows an example user interface 900 showing available quick actions throughout an agent workspace, according to one or more embodiments.

FIG. 9 depicts an example workspace in which snippets are utilized. The interface depicts an agent workspace 900 which allows an agent to manage enterprise resources. In the example shown, the agent workspace 900 depicts a workspace for agent Briana Adams in which the agent is assigned to respond to an issue reported by Alan Turner. In one or more embodiments, agent workspace 900 may reflect a version of agent workspace 800 and/or agent workspace 700 after actions have been performed which were described herein with respect to FIGS. 7-8. The agent workspace 800 may include a chat area in which the agent (i.e., Briana Adams) may correspond with the user (i.e., Alan Turner). The agent may enter text or commands through the chat interface 910, or through the work notes module 915. In one or more embodiments, the agent may enter data or commands through other user input modules within the user interface 900.

In agent workspace 900, the agent may utilize the "work notes" portion (e.g., a non-chat interface) to utilize quick actions. As shown, the agent may enter quick action "/CI." For purposes of this example, the quick action "/CI" may create an incident. That is, the quick action may allow a user to utilize a text entry portion of the user interface to perform an action that is alternatively provided by another module (i.e., 740 of FIG. 7). However, it should be understood that the functionality may not be otherwise available within the agent workspace. Returning to 920, the user's input of the "/CI" action command may trigger secondary menu 935. As shown, in one or more embodiments, the secondary menu may be utilized to collect other information from the agent in order to perform the requested action. Here, after the "create incident" quick action is selected, the secondary menu 935 is presented to the user. In this example, the secondary menu is utilized to perform the task of creating an incident. Specifically, in the example, the secondary menu provides prompts to gather data to perform the requested action (i.e., creating an incident). Here, the secondary menu prompts the user to select a priority level for the incident to be created. As depicted in 920, the user may enter "2" in this example, to represent "LEVEL 2-MEDIUM" as described in the menu item 940. For purposes of this example, the results 930 show a confirmation of the incident that has been created.

In one or more embodiments, additional secondary menus may be triggered. As an example, the user could have selected or entered "2", and in response, another menu many be displayed. For example, the user interface may display a menu from which an Assignment Group may be selected. The menus may continue on until all the information is gathered from which the incident may be created.

Figure 10:
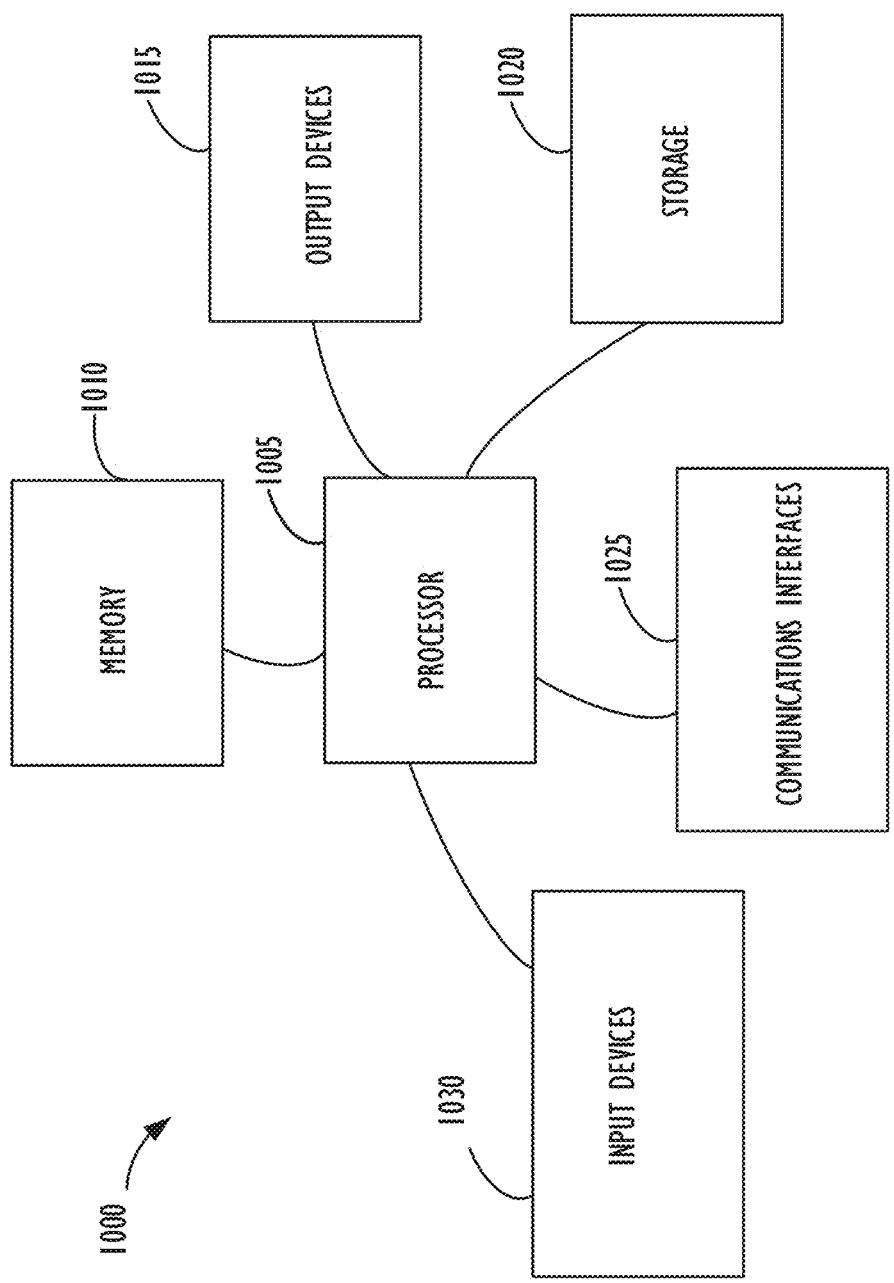
FIG. 10 illustrates a high-level block diagram 1000 of a processing device (computing system) that may be used to implement one or more disclosed embodiments.

FIG. 10 illustrates a high-level block diagram 1000 of a processing device (computing system) that may be used to implement one or more disclosed embodiments (e.g., data server computers 110, client computers 115, cloud resources platform/network 210, client devices 204A-204E, client instance 308, server instances 214, data centers 306A-306B, network device 405, client instance 450, etc.). For example, computing device 1000 illustrated in FIG. 10 could represent a client device or a physical server device and include either hardware or virtual processor(s) depending on the level of abstraction of the computing device. In some examples (without abstraction) computing device 1000 and its elements as shown in FIG. 10 each relate to physical hardware and in some examples one, more, or all of the elements could be implemented using emulators or virtual machines as levels of abstraction. In any case, no matter how many levels of abstraction away from the physical hardware, computing device 1000 at its lowest level may be implemented on physical hardware. As also shown in FIG. 10, computing device 1000 may include one or more input devices 1030, such as a keyboard, mouse, touchpad, or sensor readout (e.g., biometric scanner) and one or more output devices 1015, such as displays, speakers for audio, or printers. Some devices may be configured as input/output devices also (e.g., a network interface or touchscreen display). Computing device 1000 may also include communications interfaces 1025, such as a network communication unit that could include a wired communication component and/or a wireless communications component, which may be communicatively coupled to processor 1005. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 10, processing device 1000 includes a processing element such as processor 1005 that contains one or more hardware processors, where each hardware processor may have a single or multiple processor cores. In one embodiment, the processor 1005 may include at least one shared cache that stores data (e.g., computing instructions) that are utilized by one or more other components of processor 1005. For example, the shared cache may be a locally cached data stored in a memory for faster access by components of the processing elements that make up processor 1005. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 10, the processing elements that make up processor 1005 may also include one or more other types of hardware processing components, such as graphics processing units (GPUs), application specific integrated circuits (ASICs), field-programmable gate arrays (FPGAs), and/or digital signal processors (DSPs).

FIG. 10 illustrates that memory 1010 may be operatively and communicatively coupled to processor 1005. Memory 1010 may be a non-transitory medium configured to store various types of data. For example, memory 1010 may include one or more volatile devices such as random access memory (RAM). Non-volatile storage devices 1020 can include one or more disk drives, optical drives, solid-state drives (SSDs), tap drives, flash memory, read only memory (ROM), and/or any other type memory designed to maintain data for a duration time after a power loss or shut down operation. In certain embodiments, the non-volatile storage devices 1020 may be used to store overflow data if allocated RAM is not large enough to hold all working data. The non-volatile storage devices 1020 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1005. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 1005 to accomplish specific, non-generic, particular computing functions.

After the compiling process, the encoded instructions may then be loaded as computer executable instructions or process steps to processor 1005 from storage 1020, from memory 1010, and/or embedded within processor 1005 (e.g., via a cache or on-board ROM). Processor 1005 may be configured to execute the stored instructions or process steps in order to perform instructions or process steps to transform the computing device into a non-generic, particular, specially programmed machine or apparatus. Stored data, e.g., data stored by a storage device 1020, may be accessed by processor 1005 during the execution of computer executable instructions or process steps to instruct one or more components within the computing device 1000.

A user interface (e.g., output devices 1015 and input devices 1030) can include a display, positional input device (such as a mouse, touchpad, touchscreen, or the like), keyboard, or other forms of user input and output devices. The user interface components may be communicatively coupled to processor 1005. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 1000 may comprise other components well known in the art, such as sensors, powers sources, and/or analog-to-digital converters, not explicitly shown in FIG. 10.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of.

Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A non-transitory computer readable medium comprising computer readable code executable by one or more processors to:
   receive user input via a user input module of a chat interface, wherein the user input indicates an action to be performed, and wherein the action comprises creating an incident;
   in response to receiving the user input indicating the action to create the incident:
      determine an agent profile associated with the user input,
      identify an agent group to which the agent profile belongs, wherein the agent group is based at least in part on a team or role associated with the agent profile,
      determine a secondary menu based on the agent group, the secondary menu comprising a subset of selectable parameters of a plurality of selectable parameters indicating how the action is performed, the plurality of selectable parameters comprising priority levels for the incident, wherein different subsets of priority levels are available to different agent groups, and
      present the secondary menu in association with the user input module;
   detect a selection of a selectable parameter from the subset of selectable parameters; and
   trigger the action based on the selected parameter.

2. The non-transitory computer readable medium of claim 1, wherein the user input module is comprised in an agent workspace, and wherein the action is associated with a process for the agent workspace.

3. The non-transitory computer readable medium of claim 2, wherein the secondary menu comprises a plurality of preconfigured text selections.

4. The non-transitory computer readable medium of claim 3, wherein the agent workspace and the preconfigured text selections are associated with the agent profile.

5. The non-transitory computer readable medium of claim 1, wherein the computer readable code to trigger the action comprises computer readable code to:
   determine an external application associated with the action; and
   transmit a request to the external application to trigger the action via an application program interface ("API").

6. The non-transitory computer readable medium of claim 1, wherein the user input comprises an action parameter, and wherein the computer readable code to determine the secondary menu further comprises computer readable code to:
utilize the action parameter as a search query for a search domain comprising the plurality of selectable parameters to obtain the subset of selectable parameters,
wherein the computer readable code to present the secondary menu comprises computer readable code to present the subset of selectable parameters.

7. The non-transitory computer readable medium of claim 1, wherein the computer readable code is executable by the one or more processors to:
present a result of the action via the user input module.

8. A system to utilize quick actions, comprising:
one or more processors; and
one or more memory devices comprising computer readable code executable by the one or more processors to:
receive user input via a user input module of a chat interface, wherein the user input indicates an action to be performed, and wherein the action comprises creating an incident;
in response to receiving the user input indicating the action to create the incident:
determine an agent profile associated with the user input,
identify an agent group to which the agent profile belongs, wherein the agent group is based at least in part on a team or role associated with the agent profile,
determine a secondary menu based on the agent group, the secondary menu comprising a subset of selectable parameters of a plurality of selectable parameters indicating how the action is performed, the plurality of selectable parameters comprising priority levels for the incident, wherein different subsets of priority levels are available to different agent groups, and
present the secondary menu in association with the user input module;
detect a selection of a parameter from the subset of selectable parameters; and
trigger the action based on the user input and the selected parameter.

9. The system of claim 8, wherein the user input module is comprised in an agent workspace, and wherein the action is associated with a process for the agent workspace.

10. The system of claim 9, wherein the secondary menu comprises a plurality of preconfigured text selections.

11. The system of claim 10, wherein the agent workspace and the preconfigured text selections are associated with the agent profile.

12. The system of claim 8, wherein the computer readable code to trigger the action comprises computer readable code to:
determine an external application associated with the action; and
transmit a request to the external application to trigger the action via an application program interface ("API").

13. The system of claim 8, wherein the user input further comprises an action parameter, and wherein the computer readable code to determine the secondary menu further comprises computer readable code to:
utilize the action parameter as a search query for a search domain comprising the plurality of selectable parameters to obtain the subset of selectable parameters,
wherein the computer readable code to present the secondary menu comprises computer readable code to present the subset of selectable parameters.

14. The system of claim 8, wherein computer readable code is executable by the one or more processors to:
present a result of the action via the user input module.

15. A method for utilising quick actions, comprising:
receiving user input via a user input module in a chat interface of an agent workspace, wherein the user input indicates an action to be performed, and wherein the action comprise s creating an incident;
in response to receiving the user input indicating the action to create the incident:
determine an agent profile associated with the user input,
identify an agent group to which the agent profile belongs, wherein the agent group is based at least in part on a team or role associated with the agent profile,
determining a secondary menu based on the agent group, the secondary menu comprising a subset of selectable parameters of a plurality of selectable parameters indicating how the action is performed, the plurality of selectable parameters comprising priority levels for the incident, wherein different subsets of priority levels are available to different agent groups, and
presenting the secondary menu in association with the user input module;
detecting a selection of a parameter from the subset of selectable parameters; and
triggering the action based on the user input and the selected parameter, wherein the action is associated with a process for the agent workspace.

16. The method of claim 15, wherein the secondary menu comprises a plurality of preconfigured text selections.

17. The method of claim 16, wherein the agent workspace and the preconfigured text selections are associated with the agent profile.

18. The method of claim 15, wherein triggering the action comprises:
determining an external application associated with the action; and
transmitting a request to the external application to trigger the action via an application program interface ("API").

* * * * *